US011350148B2

(12) United States Patent
Liu et al.

(10) Patent No.: US 11,350,148 B2
(45) Date of Patent: *May 31, 2022

(54) METHOD AND APPARATUS FOR CONTENT CURATION

(71) Applicant: AT&T Intellectual Property I, L.P., Atlanta, GA (US)

(72) Inventors: Zhu Liu, Marlboro, NJ (US); Eric Zavesky, Austin, TX (US); Bernard S. Renger, New Providence, NJ (US); Behzad Shahraray, Holmdel, NJ (US); David Crawford Gibbon, Lincroft, NJ (US); Tan Xu, Bridgewater, NJ (US); Lee Begeja, Gillette, NJ (US); Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/084,149

(22) Filed: Oct. 29, 2020

(65) Prior Publication Data
US 2021/0051358 A1 Feb. 18, 2021

Related U.S. Application Data

(63) Continuation of application No. 15/951,595, filed on Apr. 12, 2018, now Pat. No. 10,856,028.

(51) Int. Cl.
*H04N 21/258* (2011.01)
*H04N 21/658* (2011.01)
(Continued)

(52) U.S. Cl.
CPC ..... *H04N 21/25891* (2013.01); *G06F 16/437* (2019.01); *H04N 21/251* (2013.01);
(Continued)

(58) Field of Classification Search
CPC .......... H04N 21/25891; H04N 21/251; H04N 21/6582; H04N 21/4668; H04N 21/44204; H04N 21/44218; H04N 21/437
See application file for complete search history.

(56) References Cited

U.S. PATENT DOCUMENTS 7,853,600 B2  12/2010  Herz et al.
9,113,208 B2   8/2015  Belyaev et al.
(Continued)

OTHER PUBLICATIONS

"Report on Context Aware Recommendations", https://usercentricnetworking.eu/wp-content/uploads/UCN-D3_3-Final.pdf, Oct. 1, 2013, pp. 1-40.

*Primary Examiner* — Pinkal R Chokshi
(74) *Attorney, Agent, or Firm* — Guntin & Gust, PLC; Robert Gingher

(57) ABSTRACT

Aspects of the subject disclosure may include, for example, modifying a user profile associated with a user associated with a content service to generate an updated user profile according to consumption of media content by the user and user feedback information associated with the consumption of the media content, determining a user context according to information associated with user device, where the user context includes current activity of the user, modifying a set of media content according to the user context that is determined to generate an updated set of media content, where a type of media content is eliminated from the set of media content in the updated set of media content according to the user context, and presenting the updated set of content at a presentation device of the user via a personal media channel of the user associated with the content service. Other embodiments are disclosed.

20 Claims, 7 Drawing Sheets

(51) Int. Cl.
*H04N 21/466* (2011.01)
*H04N 21/442* (2011.01)
*H04N 21/25* (2011.01)
*G06F 16/435* (2019.01)
*H04N 21/437* (2011.01)

(52) U.S. Cl.
CPC . *H04N 21/44204* (2013.01); *H04N 21/44218* (2013.01); *H04N 21/4668* (2013.01); *H04N 21/6582* (2013.01); *H04N 21/437* (2013.01)

(56) References Cited

U.S. PATENT DOCUMENTS

| | | | |
|---|---|---|---|
| 9,215,489 | B2 | 12/2015 | Williams et al. |
| 9,401,771 | B2 | 7/2016 | Macleod et al. |
| 9,467,743 | B2 | 10/2016 | Ruffini et al. |
| 9,510,041 | B2 | 11/2016 | Anguiano et al. |
| 9,678,637 | B1 | 6/2017 | Brothers et al. |
| 9,736,537 | B2 | 8/2017 | Piepenbrink et al. |
| 9,788,036 | B2 | 10/2017 | Garcia Navarro et al. |
| 10,149,012 | B1* | 12/2018 | Rajagopal ........ H04N 21/44222 |
| 10,536,542 | B1 | 1/2020 | Dorner et al. |
| 2013/0080907 | A1 | 3/2013 | Skelton et al. |
| 2013/0081085 | A1 | 3/2013 | Skelton et al. |
| 2014/0215507 | A1 | 7/2014 | Wouhaybi et al. |
| 2015/0127340 | A1* | 5/2015 | Epshteyn ................ G09B 5/00 704/235 |
| 2015/0162999 | A1* | 6/2015 | Macleod ................ H04W 4/06 455/3.06 |
| 2015/0193888 | A1 | 7/2015 | Sayed |
| 2015/0358661 | A1* | 12/2015 | Navarro ............ H04N 21/2668 725/59 |
| 2016/0044356 | A1 | 2/2016 | Eatedali et al. |
| 2017/0091849 | A1 | 3/2017 | Greystoke et al. |
| 2017/0195731 | A1 | 7/2017 | Girlando et al. |
| 2018/0007436 | A1 | 1/2018 | Jose et al. |
| 2018/0114262 | A1* | 4/2018 | Sanjeevaiah Krishnaiah ............ G06Q 50/01 |
| 2018/0181566 | A1 | 6/2018 | Lee et al. |
| 2019/0320216 | A1 | 10/2019 | Liu et al. |

* cited by examiner

100

METHOD AND APPARATUS FOR CONTENT CURATION

CROSS REFERENCE TO RELATED APPLICATIONS

This application is a continuation of U.S. patent application Ser. No. 15/951,595 filed on Apr. 12, 2018. The contents of each of the foregoing is/are hereby incorporated by reference into this application as if set forth herein in full.

FIELD OF THE DISCLOSURE

The subject disclosure relates to a method and system for content curation.

BACKGROUND

Modern telecommunications systems allow consumers to utilize telephony capabilities while accessing a large variety of content. Consumers are no longer bound to specific locations when communicating with others or when enjoying content, including video programming. Network capabilities have expanded and have created additional interconnections and new opportunities for using mobile communication devices in a variety of situations. Intelligent devices offer new means for the enjoyment of network interactions in ways that anticipate consumer desires. With hundreds of TV channels and virtually unlimited amount of online media, subscription content consumers may be frustrated at the difficulty of locating their favorite content and looking for an alternative to actively selecting between channels or finding content via guides or text searches. Consumers may traverse different devices, locations, or activities and find that their content preferences change with these differing contexts.

BRIEF DESCRIPTION OF THE DRAWINGS

Reference will now be made to the accompanying drawings, which are not necessarily drawn to scale, and wherein.

DETAILED DESCRIPTION

Figure 1:
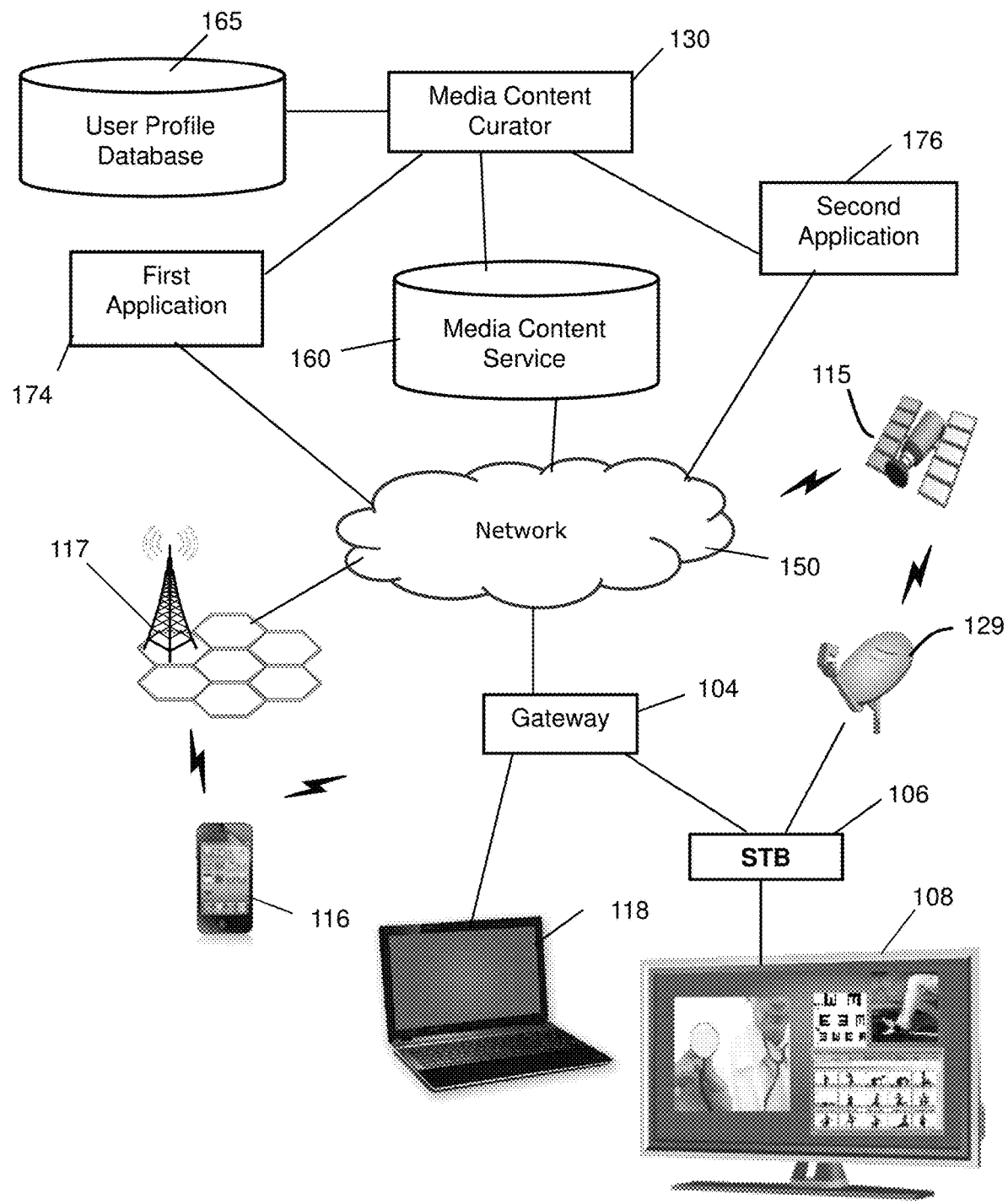
FIG. 1 depicts illustrative embodiments of a system that can be utilized for customer specific content curation.

The subject disclosure describes, among other things, illustrative embodiments for media content curation. A media content curator can modify a user profile associated with a user associated with a content service to generate an updated user profile according to consumption of media content and user feedback information. The media content curator can determine a user context according to information associated with user device. The media content curator can modify a set of media content according to the user context to generate an updated set of media content. The media content curator can present the updated set of content at a presentation device of the user via a personal media channel of the user associated with the content service. Other embodiments are described in the subject disclosure.

One or more aspects of the subject disclosure include a device, including a processing system including a processor and a memory that stores executable instructions that, when executed by the processing system, facilitate performance of operations. The operations can include monitoring consumption of media content by a user associated with a content service. The operations can also include accessing user feedback information associated with the consumption of the media content. The user feedback information can be based on an implicit user reaction to the media content. The operations can further include modifying a user profile associated with the user to generate an updated user profile according to the consumption of the media content and the user feedback information associated with the consumption of the media content. The operations can include selecting set of media content for a personal media channel associated with the user according to the updated user profile. The operations can include determining a user context according to information associated with user device, and, in turn, modifying the set of media content according to the user context that is determined to generate an updated set of media content. The user context can include current activity of the user and a type of media content be eliminated from the set of media content in the updated set of media content according to the user context. The operations can also include presenting the updated set of media content at a presentation device of the user via a personal media channel of the user associated with the content service.

One or more aspects of the subject disclosure include a method. The method can include modifying, by a processing system including a processor, a user profile associated with a user associated with a content service to generate an updated user profile according to consumption of media content by the user and user feedback information associated with the consumption of the media content. The method can also include selecting, by the processing system, set of media content for a personal media channel associated with the user according to the updated user profile. The method can further include determining, by the processing system, a user context according to information associated with user device, and, in turn, modifying, by the processing system, the set of media content according to the user context that is determined to generate an updated set of media content. The user context can include current activity of the user. A type of media content can be eliminated from the set of media content in the updated set of media content according to the user context. The method can include presenting, by the processing system, the updated set of media content at a presentation device of the user via a personal media channel of the user associated with the content service.

One or more aspects of the subject disclosure include a non-transitory, machine-readable medium, comprising executable instructions that, when executed by a processing system including a processor, facilitate performance of operations. The operations can include modifying a user profile associated with a user associated with a content service to generate an updated user profile according to consumption of media content by the user and user feedback information associated with the consumption of the media content. The operations can also include determining a user context according to information associated with user device, and, in turn, modifying a set of media content according to the user context that is determined to generate an updated set of media content. A type of media content can be eliminated from the set of media content in the updated set of media content according to the user context. The user context can include current activity of the user. The operations can include presenting the updated set of media content at a presentation device of the user via a personal media channel of the user associated with the content service.

FIG. 1 depicts an illustrative embodiment of a system 100 that can be utilized for providing media content to communication devices 116, computer devices 118, or other devices 108 via a communication network 150. In one or more embodiments, the system 100 can include a communication network 150. For example, the system 100 can include a subscription telecommunication service, such as an Internet Protocol Multimedia Subsystem (IMS) network for providing cellular/mobile communications, Internet access, and content to mobile communication devices 116, computer devices 118, or media display devices 108 (such as televisions) via a mobility network of mobile base stations 117. The system can include a media content service 160 for providing media content to subscribers. The communication network can be part of a cable, satellite, or DSL-based media content delivery system. The media content can be any type of viewable content, such as broadcast television, cable or premium television, streaming video on demand, and/or pay-per-view services. The media content service 160 can provide media content to media processing devices 106 and media display devices 108 at subscriber locations via gateway devices 104. In one or more embodiments, the system 100 can include computer devices 118 that are connected to the communication network 150 in wireless or wired configuration. For example, a wireless computer device 118 can be coupled to the communication network 150 via a gateway device 104.

In one or more embodiments, the system 100 can provide wired and wireless access to communication services and media services for mobile communication devices 116, computer devices 118, and media processor devices 106. For example, a mobile communication device 116 can communicate through the network 150 via a cellular network including base stations 117 and/or a gateway device 104 using wireless communications. In various embodiments, the mobile communication device 116 can access Internet-based services via the network 150. In another example, a media presentation device 108 can communicate, via a media processor device 106, with the network 150 or with a communication satellite 115 via a satellite receiving device 129. In one or more embodiments, communication devices 116, 118, or 108 can access the first application 174 and/or a second application 176. The first and second application 174 and 176 can be third-party services, such as social media sites, news sites, streaming media sites, service providers, service carriers, and/or search sites.

In one or more embodiments, the system 100 can incorporate functions of a service provider and/or network carrier for offering services of the provider/carrier and/or services from third parties. The system 100 can provide databases 165, which include a set of parameters for each user and/or subscriber to the system 100. For example, the system 100 can include a user profile database 165. The user profile database 165 can include subscriber and/or user profile information of a variety of types. These types can include personal identification information, demographic information, location information, subscription service information, device configuration information, and/or preference information. The user profile information that is stored in the user profile database 165 that can be used by the system 100 to provide consumer-specific performance of the system 100 as user communication devices 116, 118, and 106 access services from and/or through the system 100. For example, when a mobile communication device 116 is powered on and registers to the network 150, the network 150 can access a user profile database 165 obtain profile information that is associated with the mobile communication device 116 and/or a user of the device 116. In addition, the network 150 can access the user profile database 165 for profile information as the communication device 116 accesses the services of the network 150.

In one or more embodiments, the system 100 can include a media content curator 130. The media content curator 130 can manage one or more personal media channels for users and/or subscribers of the media content service 160. In one embodiment, the media content curator 130 can select media content that will be included on the personal channel. The media content 130 can access user profile information from the user profile database 165 and can analyze explicit and implicit user preferences. For example, a user can provide the media content service 160 with explicit preferences via a list of media content that the user prefers, such as by indicating a rating of current or previous content that the user has viewed. In another example, the media content curator can infer content preferences by analyzing the user's historic viewing patterns, interactions with the content, such as fast forwarding, and/or interactions on social media.

In one embodiment, implicit information can be used by the media content curator for determining selections and/or recommendations without accessing explicit user preferences. That is, the media content curator can analyze historic viewing patterns, social media interactions, and/or user interactions with the content, such as fast forwarding, to make inferences as to the user's implicit opinions regarding media content and can use these inferences without referring to data, where the user has provided explicit likes/dislikes or media types/titles. The media content curator can thereby move entirely away from the need for direct user expressions and toward an implicit-only model of the user's preferences.

In one embodiment, the media content curator 130 can use the user's preferences to select content that will be presented to the user on one or more personalized channels. In one example, the personalized channel can be presented to the user as part of a subscription television service. The personalized channel can be a default channel that appears whenever a user activates her television 108. The personalized channel can appear as a choice on an electronic program guide (EPG) or as an overlay on another channel. In one example, the personalized channel can be presented to the user via an application, such as an Internet accessible site for viewing media content.

In one or more embodiments, the media content curator 130 can receive information describing a user's current context. In one embodiment, user interactions with a communication device 116 can be used to determine a current user context. The current context can be determined at the user device 116, the media content service 160, and/or the media content curator 130. For example, the location of the user device, time of usage, and/or calendar information can allow the system 100 to determine that the user is on vacation. The media content curator 130 can use this information to update the set of media content that is chosen for the personalized channel to reflect differences in content types that reflect user preferences in the vacation setting as opposed to a normal work week setting.

With hundreds of TV channels and virtually unlimited amount of online media, user can be overwhelmed at the available choices while experiencing difficulty in locating their favorite content. In one or more embodiments, rather than relying on the user to actively tune to various channels and/or to search through programming guides, the system 100 can provide a personalized channel that provides the user with the media content that they truly want. Further, as a user's context changes—using different devices, moving between locations and activities—their preferences for media content are likely to change. Rather than asking the user to juggle between playlists based on location or preference, the system can automatically adjust for these contextual changes for the user and can acquire and apply similar contextual patterns of other users to make personalized channel choices that reflect deep human contexts.

In one or more embodiments, the media content curator 130 can create a personalized channel for each customer. The personalized channel can be a compilation of video clips from live content, video on demand, recorded content, as well as online videos. In one embodiment, a program list in the personalized channel can be updated in real time according to one or more factors. For example, the program list can be updated to reflect a user's context, such as the current time, the user's location, viewing preference, viewing habit/history, user mood or sentiment, and social media trends. For example, if the user tunes to her personal channel at 6:30 pm on her set top box at home, the personal channel can show her the NBC Nightly News based on past viewing history and user preferences. If the same user tunes to the personal channel at 10:00 am using her mobile device at the office, the personal channel may show her breaking news or short video clips from the prior evening's late night talk shows.

In one or more embodiments, the media content curator can include targeted advertisements in the personal channel. For example, a targeted advertisement can be inserted into selected media content. The targeted advertisement can be based on the media content and/or the user's context. For example, the media content curator 130 can access a user's viewing history and/or trending topics on a social media application 174 in which the user participates. The media content curator 130 can apply advanced machine learning and multimedia analytics technologies to the user preference and context information to infer user moods and desires that can be useful in determining advertising that may make successful consumer impressions on the user.

In one or more embodiments, the media content curator 130 can provide passive content recommendations via one or more sub-channels displayed at the personal channel or on one or more personal channels. The media content curator 130 can be constructed to provide diversity (e.g., many video streams and/or channels) along with pre-planned, long-running streams (e.g. programming for a whole day that may be dynamically shuffled).

In one or more embodiments, the media content curator 130 can deeply understand the ever-changing user context and can update the personal channel programming and targeted ads in real time. The media content curator 130 can use properties, characteristics, and/or patterns in the user's location, profile, and/or social media, to select and to update media content recommended in the personal channel or channels. The recommendations can vary over time (e.g. more news focused in the morning or more drama focused in evening) as the user's context changes. For example, the media content curator can make its selections/recommendations to account for the fact that the user tends to consume different media content in different locations or pastimes (e.g., workweek vs. vacation). In one or more embodiments, the media content curator can link user context and media content using machine learning. The machine learning can deduce connections between historical viewership and media content consumption by this user, or other users, particular with respect to types of media content (e.g., image, audio, or keyword).

In one or more embodiments, the media content curator 130 can provide an effortless and personalized experience to the user via the personalized channel Content cab consumed in a user-friendly environment without a need for searching out content by searching programming guides or channel surfing. As a result, the user may not accidently miss any media content that the user finds interesting or important. In one or more embodiments, the media content curator 130 can use context sensitivity to enables the customer to consume content easily in different situations. For example, while driving, the personal channel can provide the user with audio-only choices. While at the office, the personal channel can provide headline news in a text-only format. While at home, the personal channel can provide a set of media content choices for full-4K, video playback.

In one or more embodiments, the media content curator 130 can enable users to share their personal channels with one other. Users can select multiple other users, who are given access to the user's personal channel. Likewise, the user can view multiple personal channels from other users. In one or more embodiments, the media content service 160 can enable the insertion of highly-directed advertisements, improved customer retention, and/or enhanced content value. In one or more embodiments, the media content curator 130 can provide recommendations that tap into older content from a content catalog, including historical segments that can provide additional revenue.

Figure 2:
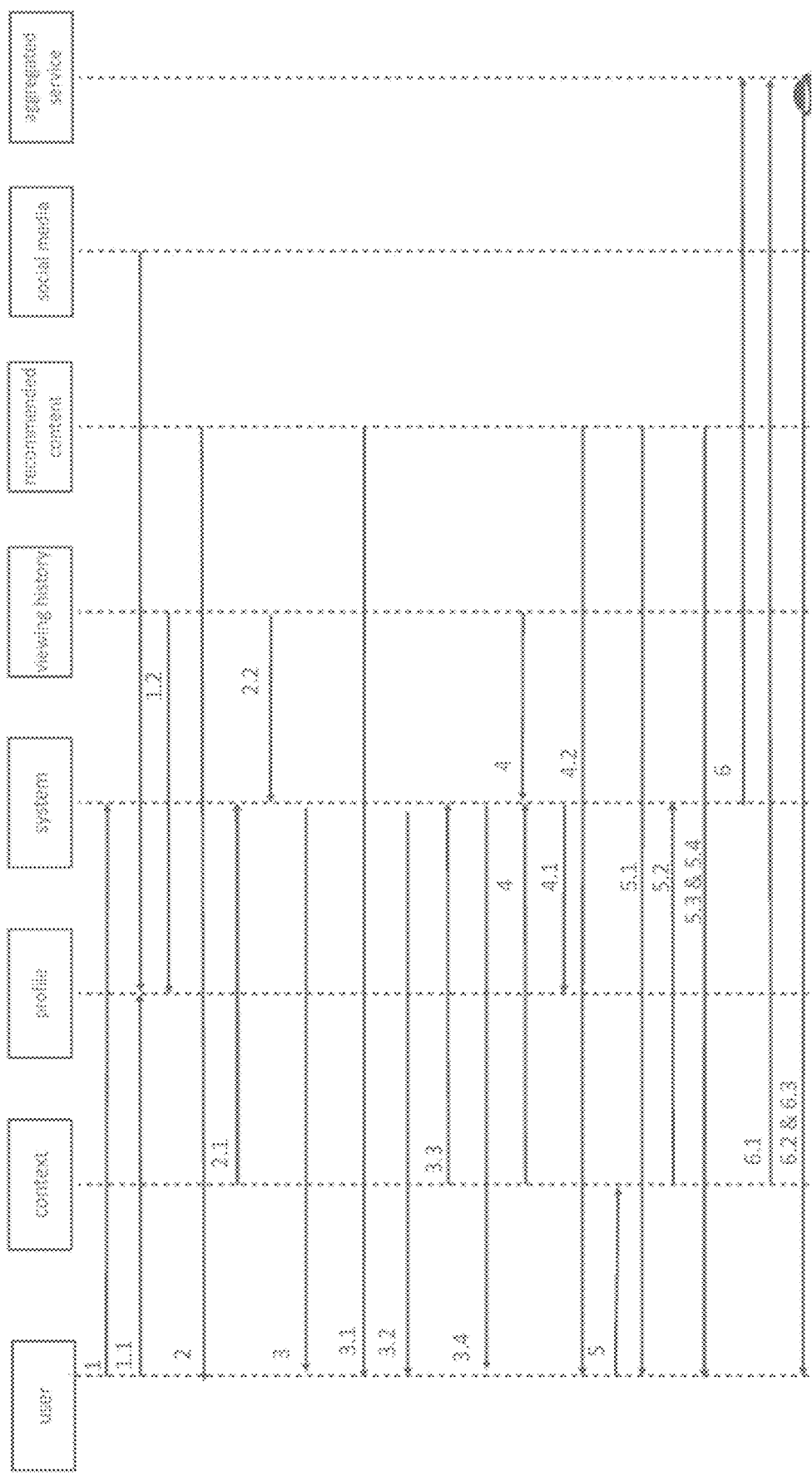
FIG. 2 depicts an illustrative embodiment of a scenario for content curation via user profiles.

FIG. 2 depicts an illustrative embodiment of a scenario for content curation via user profiles. An exemplary flow diagram is shown, where a media content curator 130 adapts a personal channel via user profile and user context information. At data flow 1, a new user can subscribe to a person channel (e.g., "my channel") service offered by the media content service 160. At flow 1.1, the user can provide to the media content service 160 certain profile information, including keywords and historical background. In one embodiment, the user can provide social media connections to social media sites 174 or other vendor sites 176, which can be accessed by media content curator 130. The user can provide information regarding prior viewership data or relationships with other vendors, which can be used for marketing and/or determining subject preferences. The resulting, initial user profile can represent a combined "active plus passive" user profile that can form a "user model" for understanding both the user's media content consumption and their potential consumer interests. At flow 1.2, view history information of the user can be accessed. Viewing feedback information can be extracted from this history. For example, explicit viewing reactions (e.g., I like or don't like this content) can be obtained. In another example, implicit reactions (e.g., I watched this content, I repeatedly watched the content or sections of the content, I laughed at this content) may also be obtained.

In one or more embodiments, at flow 2, the user can begin to consume media content through that has been recommended to user based on the initial user profile and viewing history of the user and the system refines the user profile. At flow 2.1, the media content curator 130 can observe a user's media consumption to and can log varying locations, times, genres, and content types. At flow 2.2, the media content curator 130 can include these media consumption variations while learning preferences of the user that are included in the user profile. The user can also explicitly influence the user profile via suggestions (e.g., I like documentaries).

In one or more embodiments, at flow 3, the media content curator 130 can suggest new sub-channels in the personal channel, or new personal channels, based on user context information, such as the time of day, the location, and/or the user mood. At flow 3.1, the media content curator 130 can intelligently couple media content, such as live broadcasts, unwatched content that the user has queued/preferred before, and/or historical content that is recommended by other contexts. For example, the media content curator 130 can use recommendations from social posts, content sources (e.g., CNN), and/or world events. At flow 3.2, the media content curator 130 may always maintains one or more channels, and may, optionally, expose a full playlist of selected media content (e.g. a traditional program guide) for long-term review. At flow 3.3, the media content curator 130 can observe one or more playback devices utilized by the user for reproduction of the content. For example, the user's mobile communication device 116, computer device 118, media processor device 106, and/or media display device 108 can provide information to the media content curator 130 regarding interactions of the user with playback applications. The playback information can be used to correlate recommendations to active content.

In one or more embodiments, at flow 4, the media content curator 130 can, optionally, send one or more "alerts" to the user's presentation device, such as a mobile communication device 116. The "alerts" may preempt the personal channel at the communication device 116 with time-sensitive media content and relevant recommendations based on that media content. The media content curator 130 can further analyze a viewing duration and a syntax of media content (e.g. long-form drama or short-form joke segment) and the location of the device. At flow 4.1, the user profile can be modified to include user consumption patterns at these times. At flow 4.2, as an optional feature, the media content curator 130 can provide relevant advertising via location-content bridges for the user to consume.

In one or more embodiments, at flow 5, the media content curator 130 can determine that the user is viewing media content at an unusual device and/or location. For example, the user may have gone on vacation. At flow 5.1, the media content curator 130 can update the set of media content that is recommended at one or more personal channels. The update recommendation can correspond with similarly-pooled and/or similarly-filtered recommendations for users in this location. For example, the media content curator can bootstrap a recommendation from a location-based crowd and/or from neighbors within a similar context. At flow 5.2, the media content curator 130 may, optionally, determine user context from the user's federated services (e.g. calendar application and/or social media viewing) and may create an event that modifies the recommendations of the personal channel. At flow 5.3, the media content curator 130 may, optionally, provide alternate recommendations, such as recommending a short-form joke segment in the morning, even where the user's typical genre/format differs from short-form joke segments. At flow 5.4, multiple personal channels can be selected or reviewed, which can indicate a feedback/preference to system.

In one or more embodiments, at flow 6, the media content curator 130 can also feed information from the individual back to the user device as aggregated data insights. At flow 6.1, the media content curator 130 can offer preferences, location, and/or consumption information as an insight suite to advertisers, system planners, and/or content creators. At flow 6.2, the media content curator 130 can generate an "ad-words" type of formulation, which can be offered to advertisers, who are bidding richer exposure to users. At flow 6.3, the media content curator 130 may, optionally, include an opt-in provision, where users are compensated for providing preference insights.

In one or more embodiments, the system 100 can determine which online videos may be of interest to the user. For example, the media content curator 130 can search online video aggregation collects based on keywords, derived from the user profile, that correspond to matters of interested to the user. The media content curator 130 can also create social connections with other users, who have proven to exhibit viewing habits similar to those of the user. The media content curator 130 can mine these social media resources for postings or references to media content that may well prove to be of interest to the user. In another embodiment, the media content curator 130 can recommend, within the personal channel, content that is not owned or available to the user via the subscription agreement. The media content curator 130 can offer to procure media content that should be of interest to the user, based on the user profile and context.

In one or more embodiments, the media content curator 130 can recommend media content at the personal channel that is highly location dependent. For example, if the user is traveling in New York City, then the media content curator 130 can anticipated that the user may be very interested in local news/events in the New York City area. In another example, the media content curator 130 can insert advertising based on the location context as the user nears a location of a store or restaurant.

In one or more embodiments, the media content curator 130 can incorporate into the personal channel home video or other content that is generated by the user. For example, the user can provide the media content curator 130 with access to home videos from a recent vacation. The media content curator 130 can generate a highlight or summary of the videos and insert these generated version into the personal channel as a viewing option. In one embodiment, during a playback of media content, the media content curator 130 can provide recommendations for alternative content, particularly, if the user's context changes. For example, if the user's location changes or if the user changes to a different device, the media content curator 130 can provide a new recommendation, media playback, of one or more media content items that may be a better fit for the new context.

In one or more embodiments, the media content curator 130 can continuously collect the user's feedback, including explicit feedback (e.g., voting for like or dislike) and/or implicit feedback (e.g., fast forward, skipping content, tune to regular channels while certain content is being played, etc.). The media content curator 130 can use the feedback information to continuously update and improve the user profile and preference modeling associated with the user. In one embodiment, the media content at the personal channel can include dynamic content. For example, clips of breaking news videos or of interesting new videos just uploaded by the user's friends may be inserted into the personal channel even as the customer is viewing another media content item.

In one or more embodiments, the media content curator 130 can aggregate and recommend media content at various levels or lengths. For example, the media content curator 130 can recommend the program level media content (e.g. the entire 1 hour episode) and/or sub-program level media content (e.g., the 10 minute monologue at the beginning of a talk show). In one embodiment, the media content curator 130 can segment long form content (e.g. half hour news program) into a series of stories. The media content curator 130 can select for the personal channel only those stories or video clips (e.g., 5 minutes report to a specific news) that the user profile and context indicate as being of interest.

In one or more embodiments, the media content curator 130 can combine related content from multiple channels (e.g., reports of a breaking news from ABC and CBS) together at the personal channel to form a more complete coverage for the user. In one embodiment, the media content curator 130 can use the context of the user (e.g., location, mood, time, device, surrounding environment, etc.) to determine when to present the selection on the personal channel or when to schedule presentation of the item. The media content curator 130 can also use the content for determining a format and/or a delivery scheme. For example, if the context indicates that the user is currently using a mobile communication device while jogging, then the media content curator 130 can determine that the best format for a media content item is audio only (e.g., a podcast). Similarly, if the context indicates some limitations with respect to network connectivity and/or bandwidth, then the media content curator 130 may select a media content item that is pre-loaded onto the current user device.

In one or more embodiments, the media content curator 130 can provide a "just missed" channel. The "just missed" channel can feature "live" content that the media content curator 130 had highlighted for the user's attention at a particular time, but that the user had not viewed during live broadcast. For example some events, such as a sporting or a talent show contests, are broadcast as co-watching events, where most users want to enjoy viewing/participation at the time of broadcast. However, the user may be unavailable during the time of broadcast, or may be viewing a different selection (e.g., another live event). In such a case, the user will miss a live event that was featured by the media content curator 130. The media content curator 130 can respond to this situation by offering the user another opportunity to enjoy items that the user has missed. For example, the media content curator 130 can direct a digital video recorder (DVR) at a user's device, such as a set-top box, or at a network or cloud-based system to automatically capture the live content during original broadcast. The media content curator 130 can then offer the formerly live content to the user via the personal channel or via an additional personal "just missed" channel.

Figure 3:
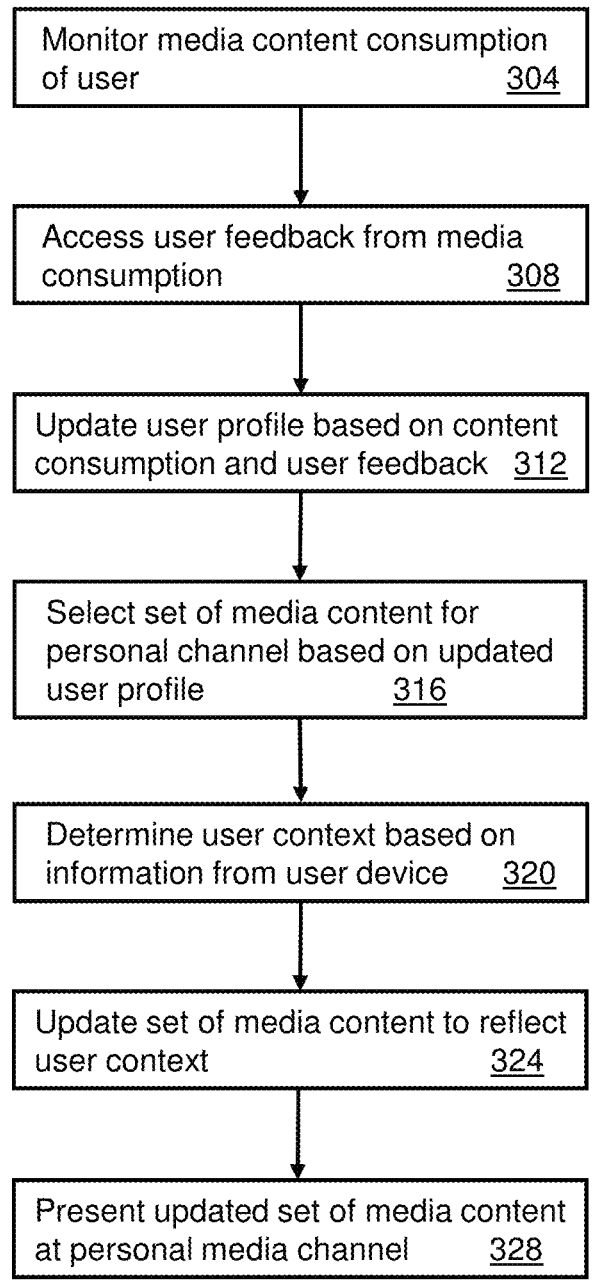
FIG. 3 depicts an illustrative embodiment of a method used in portions of the system described in FIGS. 1-2 and 4-5.

FIG. 3 depicts an illustrative embodiment of a method operating in or using portions of the system described in FIGS. 1 and 2. Method 300 can begin with step 304, in which media content curator 130 can monitor media content consumption of a user. In step 307, the media content curator 130 can access user feedback from the media consumption. The feedback can be explicit or implicit. In step 312, the media content curator 130 can update the user profile based on the content consumption and the user feedback.

In step 316, the media content curator 130 can select a set of media content for a personal media channel based on the updated user profile. In step 320, the media content curator 130 can determine a user context based on information from a user device. In step 324, the media content curator 130 can update the set of media content to reflect the user context and, in step 328, present the updated set of media content at the personal media channel.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
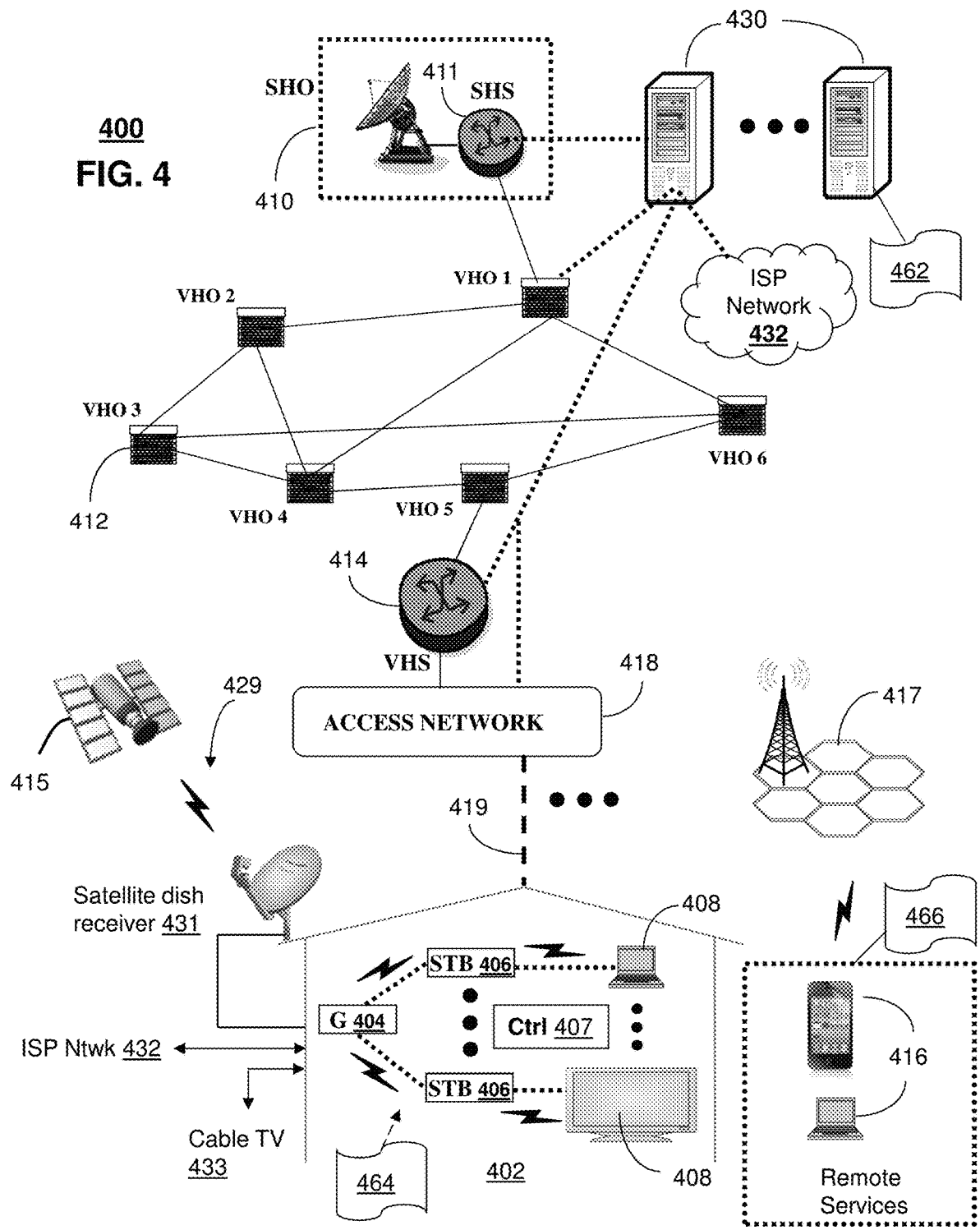
FIGS. 4-5 depict illustrative embodiments of communication systems that provide media services illustrated in FIGS. 1-3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with [refer to system 100 of FIG. 1 as another representative embodiment of communication system 400. For instance, one or more devices illustrated in the communication system 400 of FIG. 4 can modify a user profile associated with a user associated with a content service to generate an updated user profile according to consumption of media content and user feedback information, determine a user context according to information associated with user device, modify a set of media content according to the user context to generate an updated set of media content, and present the updated set of content at a presentation device of the user via a personal media channel of the user associated with the content service.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (Wi-Fi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a media content curator 130 described in FIG. 1. The media content curator 430 can use computing and communication technology to perform function 462, which can include among other things, the media content curation techniques described by method 300 of FIG. 3. For instance, function 462 of server 430 can be similar to the functions described for the media content curator 130 of FIG. 1 in accordance with method 300. The media processors 406 and wireless communication devices 416 can be provisioned with software functions 464 and 466, respectively, to utilize the services of media content curator 430. For instance, functions 464 and 466 of media processors 406 and wireless communication devices 416 can be similar to the functions described for the communication devices 116, 118, 106, and 108 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
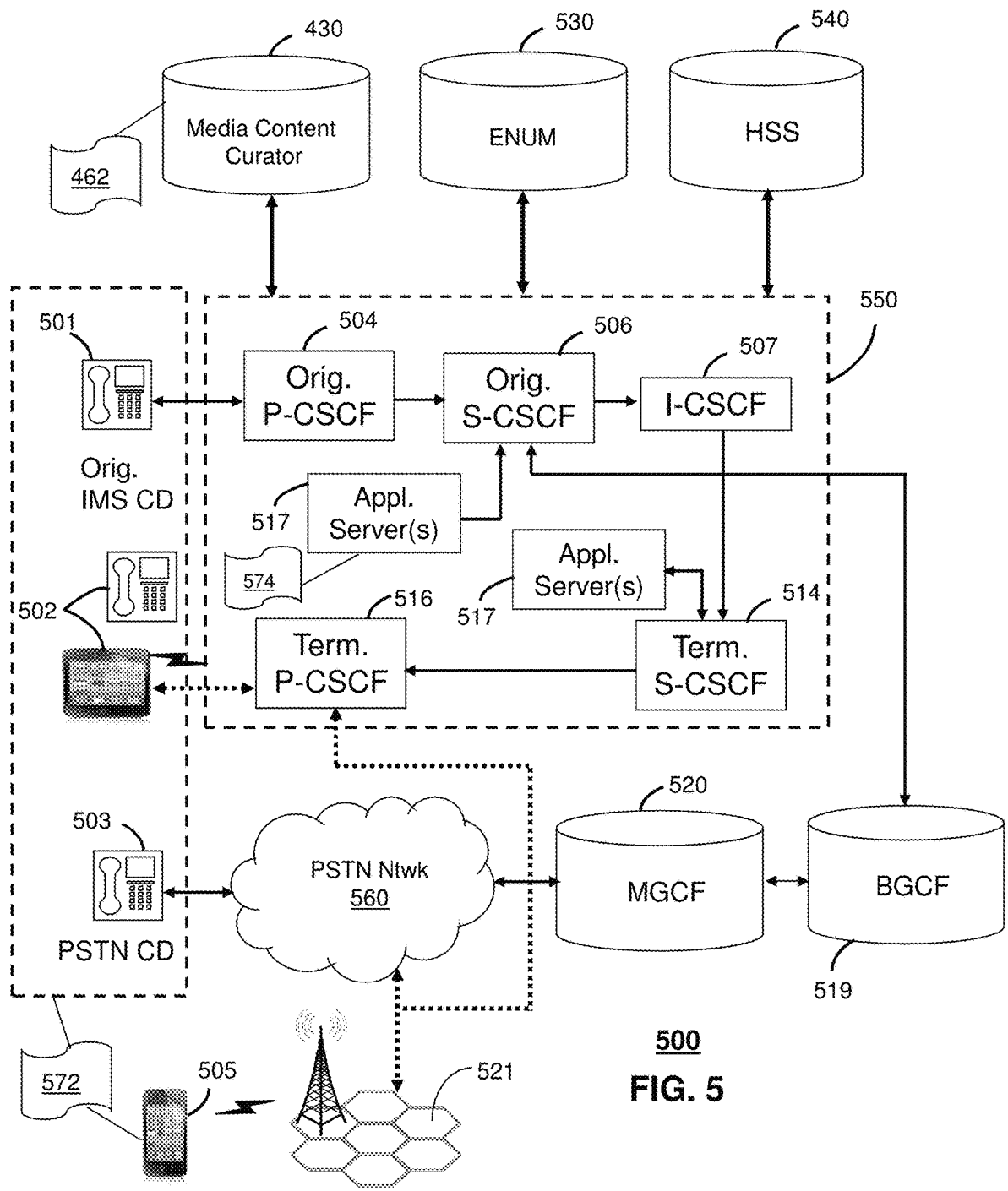

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400, which can modify a user profile associated with a user associated with a content service to generate an updated user profile according to consumption of media content and user feedback information, determine a user context according to information associated with user device, modify a set of media content according to the user context to generate an updated set of media content, and present the updated set of content at a presentation device of the user via a personal media channel of the user associated with the content service.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a Wi-Fi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media content curator 430 of FIG. 4 can be operably coupled to communication system 500 for purposes similar to those described above. Media content curator 430 can perform function 462 and thereby provide media curation services to the CDs 501, 502, 503 and 505 of FIG. 5 similar to the functions described for server 130 of FIG. 1 in accordance with method 300 of FIG. 3. CDs 501, 502, 503 and 505, which can be adapted with software to perform function 572 to utilize the services of the media content curator 430 similar to the functions described for communication devices 116 of FIG. 1 in accordance with method 300 of FIG. 3. Media content curator 430 can be an integral part of the application server(s) 517 performing function 574, which can be substantially similar to function 464 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
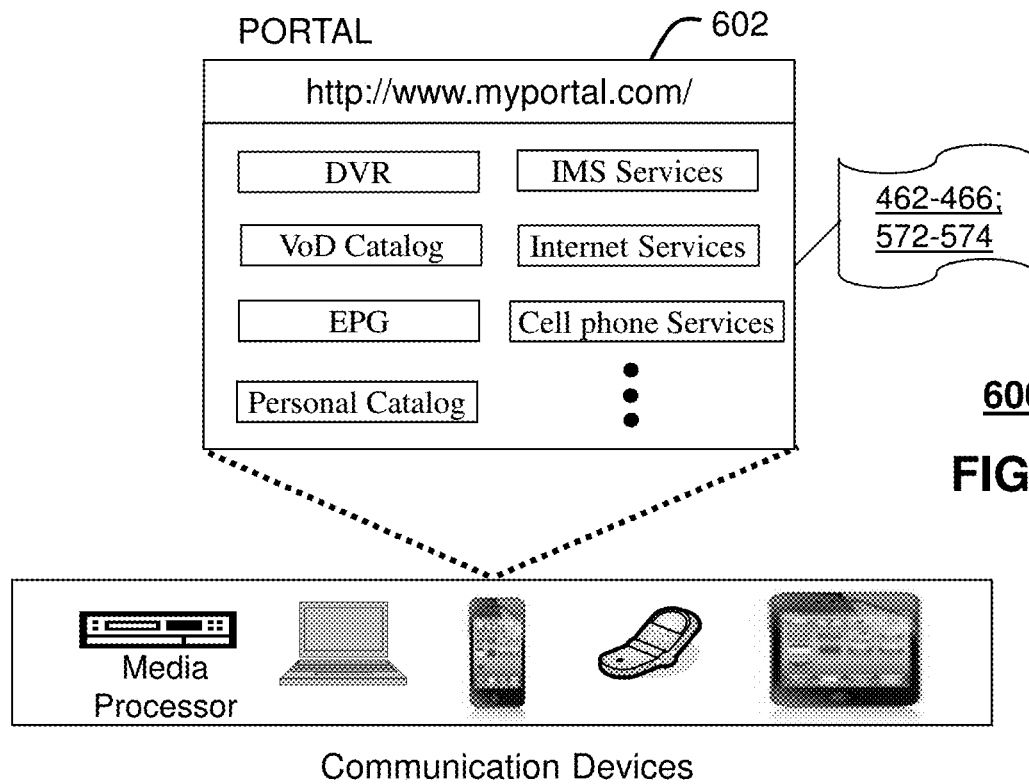
FIG. 6 depicts an illustrative embodiment of a web portal for interacting with the communication systems of FIGS. 1-2 and 4-5.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of system 100 of FIG. 1, and communication systems 400-500. For instance, users of the services provided by media content curator 130 or server 430 can log into their on-line accounts and provision the servers 130 or server 430 with a feature that a user may want to program such as user profiles, provide contact information to server to enable it to communication with devices described in FIGS. 1 and 4-5, and so on. Service providers can log onto an administrator account to provision, monitor and/or maintain the system 100 of FIG. 1 or server 430.

Figure 7:
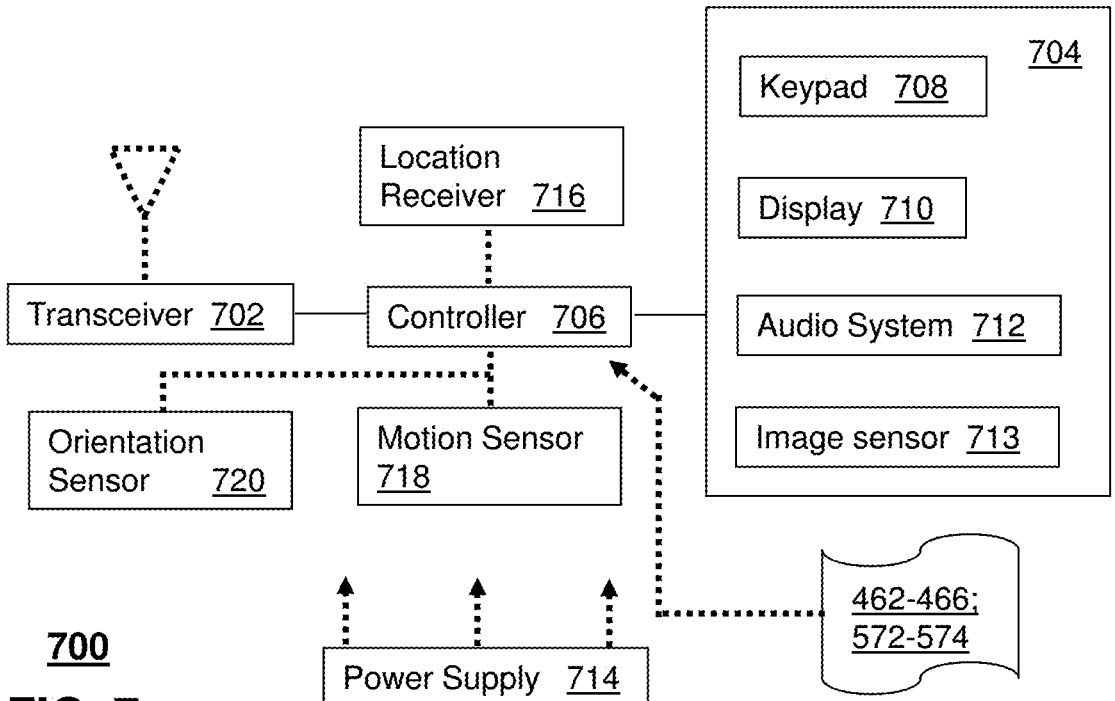
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 1, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in system of FIG. 1, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, in one embodiment, the system can train a model using one or more elements of a viewing history, an electronic program guide, metadata extracted from content, and social media data. A machine learning algorithm can process geolocation, calendars, real-time broadcast feeds, and specifics of user devices to create recommendations, targeted channel list, and/or specific indexes or streams. In one embodiment, the system can summarize a video or a trailer based on knowledge of the user's social preferences (e.g., personalized curation). The system can summarize further generated summarized video for a group of viewers, such as a family, where all of the social preferences of the entire group are aggregated across all the individual user preferences.

In one embodiment, the system can create connections between related media content. For example, if a news event happens in one area of interest, then this event may give rise to a related happening in a different (but somehow related) field interest. Once the system has established (from past trends) that the viewer is interested in both fields, then the system can present media content from both fields in a linked fashion upon the occurrence of the event in the first field. In one embodiment, the system can provide smart television scheduling through the personal media channel. The system can schedule an order in which programs, clips, or sub-channels are shown to a user according to the user's interests. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
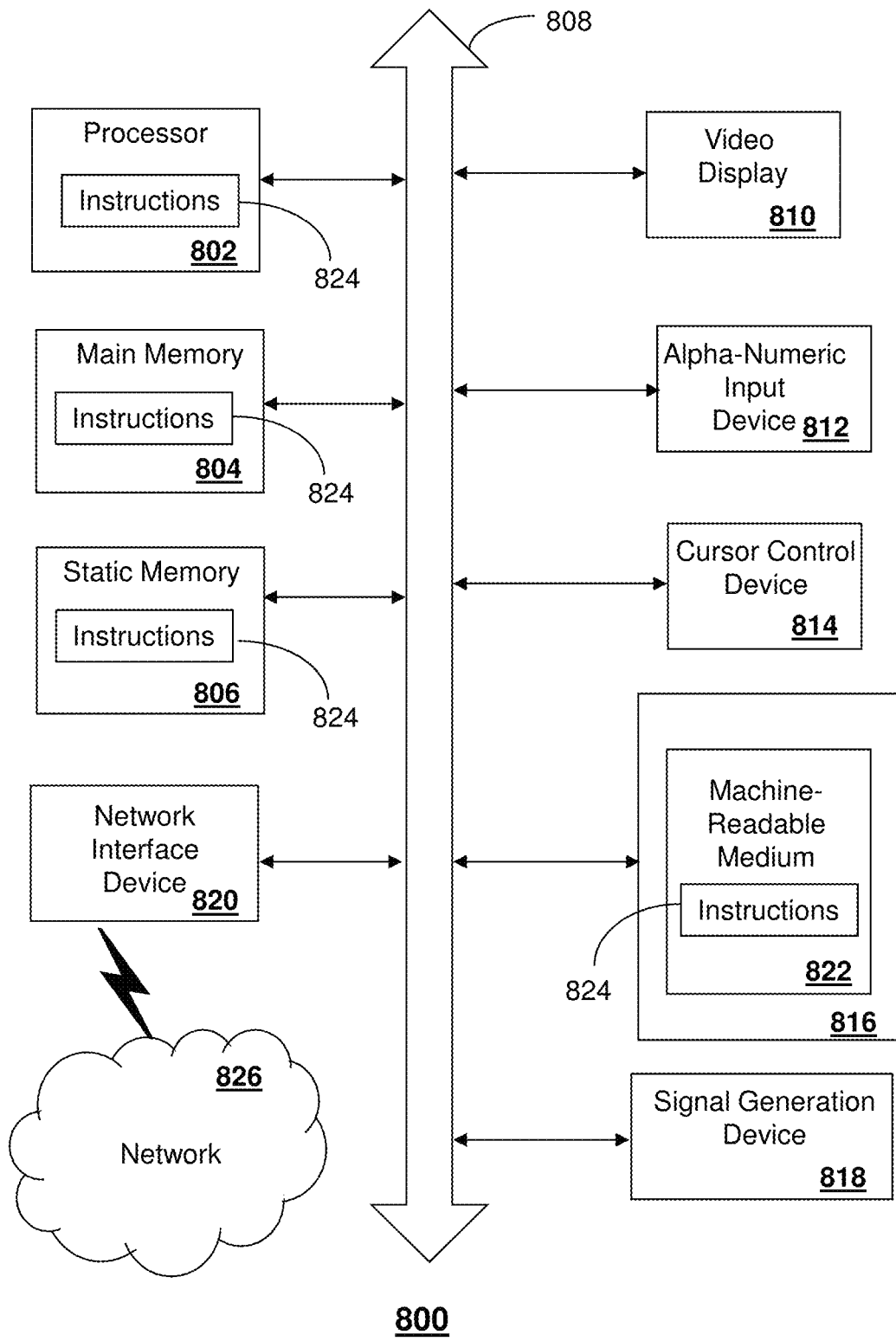
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the media content curator 430, the media processor 106, the mobile communication device 116, the media presentation device 108, the computer device 118, and other devices of FIGS. 1, and 4-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, the operations comprising:
   selecting a set of media content for a personal media channel associated with a user according to a user profile;
   determining a user context according to information associated with a user device of the user, wherein the user context includes current activity of the user;
   determining neighbors having a similar context;
   applying machine learning to the user context and context of the neighbors to infer user moods and desires;
   modifying the set of media content according to the user moods and desires to generate an updated set of viewable media content, wherein a type of media content is eliminated from the set of media content in the updated set of viewable media content according to the user context and the neighbors with the similar context, and wherein the type of media content eliminated from the set of media content corresponds to a format of the type of media content, a delivery scheme of the type of media content, or a combination thereof; and
   presenting the updated set of viewable media content at a presentation device of the user via the personal media channel of the user.

2. The device of claim 1, wherein the current activity of the user includes skipping a portion of the updated set of viewable media content.

3. The device of claim 2, wherein the modifying of the set of media content is further according to a change in the user context.

4. The device of claim 1, wherein the operations further comprise updating the user profile based on an explicit user reaction to the updated set of viewable media content.

5. The device of claim 1, wherein the set of media content includes full length content, segments of content, content clips, personally generated content, or any combination thereof.

6. The device of claim 1, wherein the user context further includes a user location, a time at the user location, environmental characteristics of the user location, capabilities of the user device, or any combination thereof, and wherein the neighbors are located close to the user location.

7. The device of claim 1, wherein the operations further comprise updating the user profile based on tuning to regular channels while the updated set of viewable media content is being played.

8. The device of claim 1, wherein the user context further includes a user mood.

9. The device of claim 1, wherein the set of media content includes a first media content item that is selected based on a presentation limitation.

10. The device of claim 9, wherein the presentation limitation is associated with a capability of the user device.

11. The device of claim 9, wherein the presentation limitation is associated with the current activity of the user.

12. The device of claim 1, wherein the set of media content is further modified by adding advertising according to the user context.

13. The device of claim 1, wherein the presentation device is the user device, wherein the personal media channel is a television channel provided to the user device.

14. The device of claim 1, wherein the operations further comprise identifying an event associated with a social media service, wherein the set of media content is further modified by adding a second media content item according to the event responsive to the identifying of the event.

15. A method, comprising:
   selecting, by a processing system including a processor, a set of media content for a personal media channel associated with a user according to a user profile;
   determining, by the processing system, a user context according to information associated with user device, wherein the user context includes current activity of the user;
   determining, by the processing system, neighbors having a similar context;
   applying machine learning, by the processing system, to the user context and context of the neighbors to infer user moods and desires;
   modifying, by the processing system, the set of media content according to the user moods and desires to generate an updated set of media content, wherein a type of media content is eliminated from the set of media content in the updated set of media content according to the user context and the neighbors with the similar context, and wherein the type of media content eliminated from the set of media content corresponds to a format of the type of media content, a delivery scheme of the type of media content, or a combination thereof; and
   presenting, by the processing system, the updated set of media content at a presentation device of the user via the personal media channel of the user.

16. The method of claim 15, comprising:
   monitoring, by the processing system, viewing of the updated set of media content by the user; and
   accessing, by the processing system, user feedback information associated with the viewing of the updated set of media content, wherein the user feedback information is based on an implicit user reaction to the updated set of media content.

17. The method of claim 16, wherein the implicit user reaction includes skipping a portion of the updated set of media content, and wherein the modifying of the set of media content is further according to a change in the user context.

18. The method of claim 15, wherein the set of media content includes a first media content item that is selected based on a presentation limitation associated with the current activity of the user.

19. A non-transitory, machine-readable medium, comprising executable instructions that, when executed by a processing system including a processor, facilitate performance of operations, the operations comprising:

determining a user context according to information associated with a user device, wherein the user context includes current activity of a user;

determining neighbors having a similar context;

applying machine learning to the user context and context of the neighbors to infer user moods and desires;

modifying a set of media content according to the user moods and desires to generate an updated set of media content, wherein a type of media content is eliminated from the set of media content in the updated set of media content according to the user context and the neighbors with the similar context, and wherein the type of media content eliminated from the set of media content corresponds to a format of the type of media content, a delivery scheme of the type of media content, or a combination thereof; and presenting the updated set of media content at a presentation device of the user via a personal media channel of the user.

20. The non-transitory, machine-readable medium of claim 19, wherein the modifying of the set of media content is further according to a change in the user context, and wherein the personal media channel is a television channel provided to the user device.

* * * * *